United States Patent [19]

Poulin et al.

[11] Patent Number: 5,299,981
[45] Date of Patent: * Apr. 5, 1994

[54] TRANSMISSION JOINT BODY STRUCTURE AND A METHOD OF MANUFACTURE THEREOF

[75] Inventors: Bernard Poulin, Conflans Ste Honorine; Michel Margerie, Vetheuil, both of France

[73] Assignee: Glaenzer Spicer, Poissy, France

[*] Notice: The portion of the term of this patent subsequent to Aug. 4, 2009 has been disclaimed.

[21] Appl. No.: 794,412

[22] Filed: Nov. 18, 1991

[30] Foreign Application Priority Data

Dec. 3, 1990 [FR] France ................ 90 15112

[51] Int. Cl.⁵ ..................... F16C 3/00; F16D 3/202
[52] U.S. Cl. ........................ 464/111; 464/181
[58] Field of Search ............ 464/111, 123, 124, 181, 464/905, 170

[56] References Cited

U.S. PATENT DOCUMENTS

| 4,036,032 | 7/1977 | Durum ............... | 464/111 |
| 5,009,628 | 4/1991 | Rouillot ............. | 464/111 |
| 5,135,438 | 8/1992 | Poulin et al. ....... | 464/111 |
| 5,173,083 | 12/1992 | Van Dest ........... | 464/111 |

FOREIGN PATENT DOCUMENTS

| 335781 | 3/1989 | European Pat. Off. . |
| 1218082 | 5/1960 | France . |
| 1228149 | 8/1960 | France . |
| 2508851 | 7/1982 | France . |
| 2586767 | 3/1989 | France . |
| 2076936 | 12/1981 | United Kingdom . |

Primary Examiner—Daniel P. Stodola
Attorney, Agent, or Firm—Wenderoth, Lind & Ponack

[57] ABSTRACT

A transmission joint body (10) intended to be connected to a shaft (13) has several bearing paths for articulation elements distributed around an axis (X—X) of the body. Each bearing path comprises two fixed or movable tracks (14) arranged so as to cooperate with articulation elements of the transmission joint. Each track is constituted by a first surface (16) of a metal part (14). A second surface (18) is associated with a complementary surface (20) of the joint body (10) formed in a portion (12) of the joint body constructed of a composite material constituted by a reinforced thermosetting or thermoplastic matrix. At central longitudinal axis (ACR) of each bearing path, contained in a plane containing the axis (X—X) of the shaft (13), forms an angle ($\alpha$) with the geometrical axis of the shaft.

8 Claims, 2 Drawing Sheets

TRANSMISSION JOINT BODY STRUCTURE AND A METHOD OF MANUFACTURE THEREOF

This invention relates to a transmission joint body intended to be connected to a shaft or to a rotating transmission component of the type comprising several bearing paths for articulation elements distributed around the axis of the joint body, each comprising two tracks arranged so as to cooperate with articulation elements of the transmission joint. Each track is constituted by a first surface of a metal part, whereof a second surface is associated with a complementary surface of the joint body formed in a portion of the joint body constructed of a composite material constituted by a reinforced thermosetting or thermoplastic matrix.

Such a joint body of composite structure is for example described and shown in document EP-A-335,781.

In the various embodiments described and shown in that document, the bearing paths are parallel to the axis of the shaft to which the transmission joint body is connected, that is to say, in fact, parallel with the general axis of the transmission joint body.

That document also proposes a process for the construction of such a joint body of composite structure, the implementation of which is particularly easy. Each track, constructed in the form of a metal part, is placed in position in the injection mould prior to the injection of the composite material.

SUMMARY OF THE INVENTION

The object of this invention is to propose an improvement to a transmission joint body of the type mentioned above.

To this end, the joint body according to the invention is characterized in that the central longitudinal axis of each bearing path, contained in a plane containing the axis of the shaft, forms an angle with the geometrical axis of the shaft.

Such a joint body of composite structure and having inclined tracks is particularly easy to put into operation and may be industrially mass produced. It is in fact possible to put the metal parts in place in the injection mould in the inclined configuration required simply by changing their positioning in the mould before the injection operation. Only the combination of a composite structure and of tracks constructed in the form of metal parts allows such ease of manufacture.

The invention also proposes a process for construction of a joint body of the type mentioned above, characterized in that it includes the steps of:

a) using an injection mould comprising at least one central core;

b) placing the metal parts in an inclined position on the central core through the intermediary of their first surfaces; and c) moulding the portion in composite material of the joint body around the metal parts and the central core.

According to other characteristics of the invention.

the second surface of the metal part is capable of moving with respect to the complementary surface of the joint body;

the second surface and the complementary surface are curved surfaces, convex and concave, respectively;

the curved surfaces are portions of cylindrical surfaces;

the radii of curvature of the portions of cylindrical surfaces are equal;

the generating lines of the first surface of the metal part are parallel with the axis of the second metal surface.

In the case where the metal parts are movable with respect to the structure of the joint body, the process according to the invention is advantageously characterized in that the portions of surfaces of the metal parts other than their first surfaces are coated with an anti-adhesive agent prior to their being placed in position in the mould.

BRIEF DESCRIPTION OF THE DRAWINGS

Other characteristics and advantages of the invention will become apparent upon a reading of the following detailed description, for the understanding of which reference will be made to the attached drawings, in which.

DETAILED DESCRIPTION OF THE PREFERRED EMBODIMENTS

Figures 1, 2:
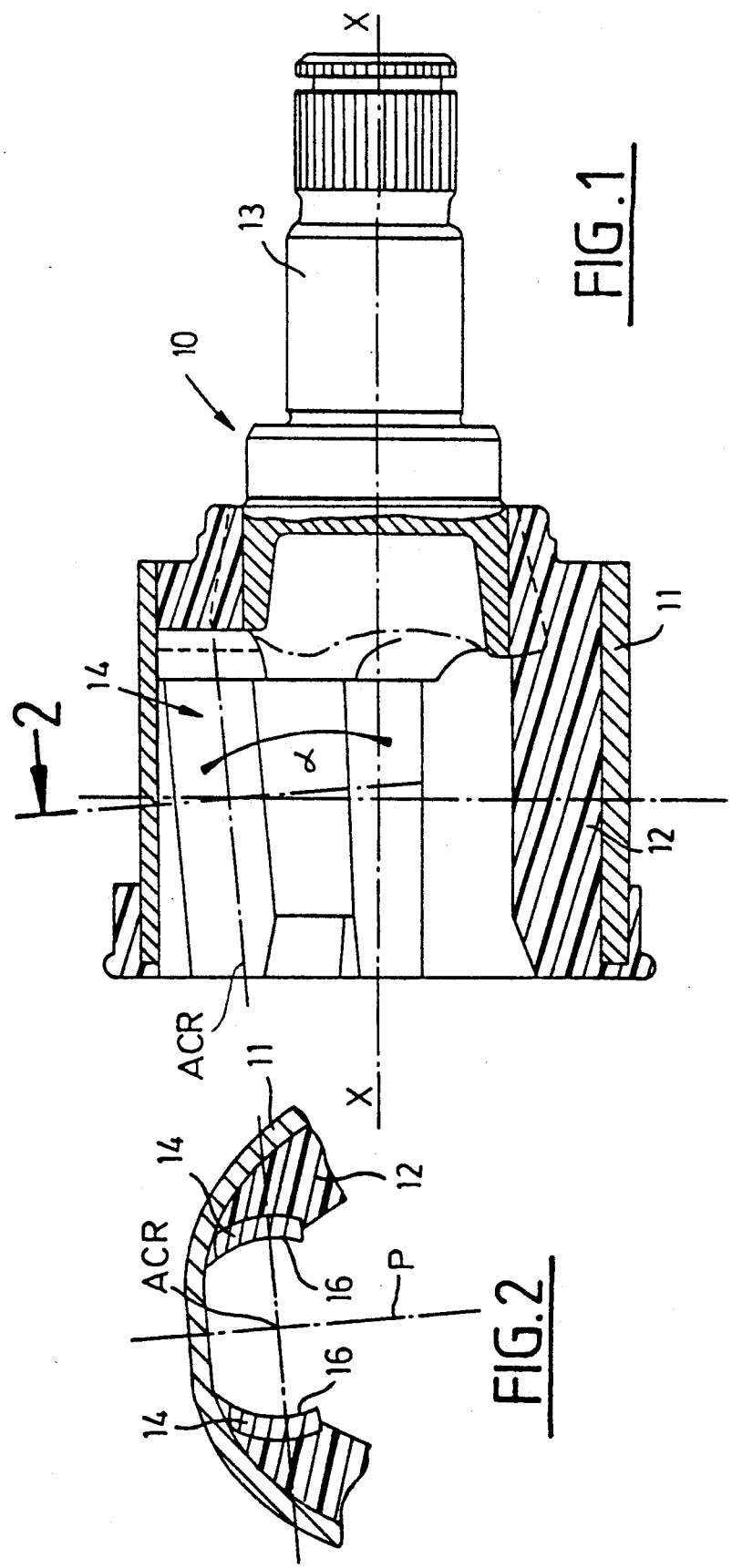
FIG. 1 is an axial sectional view of a first embodiment having fixed tracks of a transmission joint body according to the invention.
FIG. 2 is a partial sectional view along line 2—2 of FIG. 1.

In FIGS. 1 and 2 a transmission joint body 10 is recognized as belonging to the family of the transmission joint bodies of composite materials, whereof a first series of embodiments was described and shown in the document EP-A-335,781, to the content of which reference may be made in order to find out the other structural characteristics of the joint body.

The transmission joint body 10 is essentially constituted by a casing 11 and by an inner portion 12 of composite material constituted by a thermosetting or thermoplastic matrix reinforced with short fibers or with particles.

The transmission joint body 10 comprises paths for rolling or for bearing of articulation elements distributed regularly around an axis X—X of the joint body, which is also a axis of the shaft 13 to which the joint body 10 is connected.

Each bearing path comprises two tracks arranged parallel with one another so as to cooperate with articulation elements of the transmission joint (not shown).

Each track is a metal part 14 which is associated with the portion of composite material 12.

According to the invention, a central longitudinal axis ACR of each path is inclined with respect to the axis X—X by an angle $a$, a thus being greater than 0°.

The term 'central longitudinal axis' denotes the median geometrical axis of each path contained in the plane P passing through the axis X—X.

In the embodiment shown in FIGS. 1 and 2, the metal parts 14 are fixed with respect to the joint body. The positional locking of the metal parts 14 may for example, result from their design in the form of inserts partially buried at the time of moulding of the composite material, as will be described below.

Each metal insert 14 comprises a first surface 16 which is adapted to co-operate with an articulation element, their geometries being associated.

Figure 3:
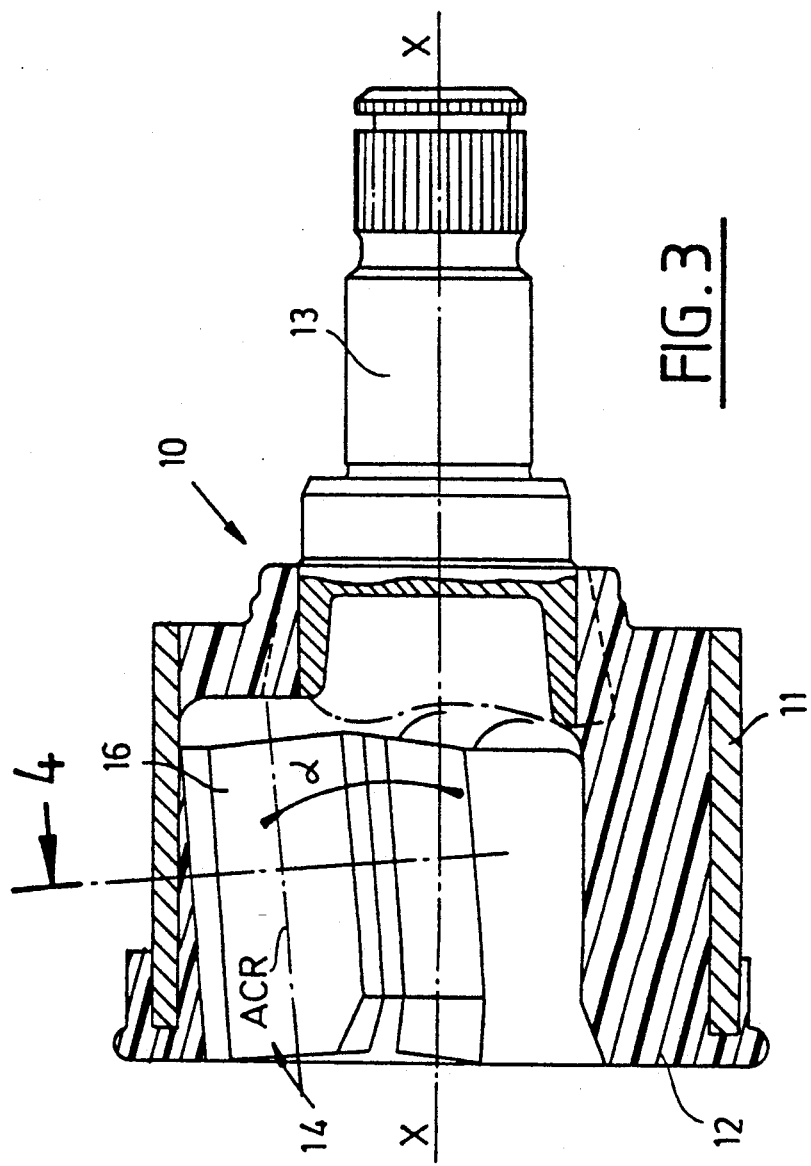
FIGS. 3 and 4 are views similar to those of FIGS. 1 and 2, showing a second embodiment of the invention, in which the tracks are movable with respect to the joint body.
Figure 4:
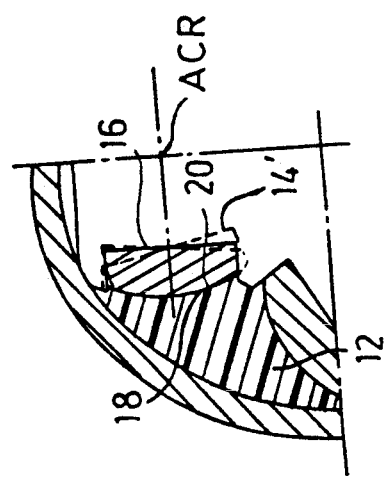

An embodiment will now be described, which is shown in FIGS. 3 and 4, wherein components identical or similar to those shown in FIGS. 1 and 2 are indicated by the same reference numbers This second embodiment of a transmission joint body according to the invention differs essentially from the first embodiment in that the metal parts 14 are capable of moving with respect to the joint body.

Each metal part 14 comprises a first surface 16 which is adapted to cooperate with a corresponding articulation element and a second surface 18, opposite to the surface 16, which is associated with a complementary surface 20 formed of the portion 12 of the joint body in composite material.

The first surface 16, which is shown here as flat, constitutes the actual rolling track, and the second surface 18 is a convex portion with a cylindrical surface which cooperates with a complementary concave portion with a cylindrical surface 20.

The axis of the concave portion of cylindrical surface 20 is the central longitudinal axis ACR defined above.

In the embodiment shown in the FIGURES, the radii of curvature of the portions of surfaces 18 and 20 are equal.

Owing to the cooperation of the surfaces 18 and 20, the metal part 14 can move with respect to the joint body, pivoting around the axis ACR on either side of its median position shown in FIGS. 3 and 4 towards angularly offset positions, one of which is shown in chain-dotted lines 14' in FIG. 4.

Depending on the application, it is also possible to provide means (not shown) which prevent the metal parts 14 from moving with respect to the joint body in a direction parallel with the central longitudinal axis ACR.

In both embodiments, the two associated tracks may be separate elements or may be constructed in a single U-shaped piece.

Both embodiments of the joint body which have just been described may be constructed by means of a process of the type described and shown in the document EP-A-335,781.

The process is essentially characterized in that it consists in using an injection mould comprising at least one central core, in which the metal parts are placed in position on the central core, and then the portion of composite material of the joint body is moulded around the metal parts and around the central core, for example by injection.

The precise positioning of the metal parts 14 with respect to the joint body is obtained by putting them in position through the intermediary of their first surfaces 16, which cooperate with portions of surfaces of complementary profile of the core of the mould.

Upon completion of the moulding operation, the metal parts 14 are normally bound to the composite filling material 12

For the purpose of permitting removal from the mould, the core may comprise movable or expansible parts, as are known to the specialist.

When the construction of a transmission joint in accordance with FIGS. 3 and 4 is required, it is necessary for the portions of surfaces of the metal parts 14 other than their first surfaces 16 to be coated with an anti-adhesive agent prior to their being placed in position in the mould. All of the portions of external surfaces liable to be in contact with the composite material having been coated beforehand, the metal parts 14 may subsequently move with respect to the complementary surfaces 20.

The process according to the invention which enables complementary surfaces to be constructed directly is particularly advantageous, because a perfect conformity of the surfaces 18 and 20 is thus obtained.

Each transmission joint body constructed according to this process is directly associated with the metal parts 14 from which it was constructed and which are mated with it.

The invention is not limited to the embodiments which have just been described and it finds applications to various types of transmission joints and to various geometrical structures of the surfaces 16 and 18 of the metal parts 14.

We claim:

1. A transmission joint body comprising:
   a joint body having a longitudinal geometric axis; and
   a plurality of bearing paths, said bearing paths being distributed about said longitudinal geometric axis of said joint body, each said bearing path comprising two tracks;
   wherein each said track is defined by a first surface of a metal part, and wherein each said metal part has a second surface;
   wherein said joint body comprises a joint body portion made of a composite material which comprises a reinforced matrix of one of a thermosetting and a thermoplastic material;
   wherein each said second surface has a complementary surface in said joint body portion associated therewith; and
   wherein each said bearing path has a central longitudinal axis that lies in a plane with said longitudinal geometric axis and that forms an angle greater than 0° with said longitudinal geometric axis.

2. The transmission joint body of claim 1, wherein said second surfaces of said metal parts are movably mounted on said complementary surfaces of said joint body portion so as to be capable of movement relative to said complementary surfaces.

3. The transmission joint body of claim 2, wherein said second surfaces and said complementary surfaces are convex and concave curved surfaces, respectively.

4. The transmission joint body of claim 3, wherein said curved surfaces are portions of cylinders.

5. The transmission joint body of claim 3, wherein the radii of curvature of said portions of cylinders are equal.

6. The transmission joint body of claim 3, wherein the generating lines of said first surface of each said metal part are parallel to the cylindrical axis of said portion of a cylinder forming said curved surface of the respective said curved surface.

7. A process of constructing a transmission joint body, comprising the steps of:
   providing an injection mould having at least one central core;
   providing a plurality of metal parts, each said metal part having a first surface defining a track and a second surface;
   placing said metal parts in position on said central core by their said first surfaces so as to define a plurality of bearing paths, each said bearing path comprising two said tracks and having a central longitudinal axis; and
   injecting a composite material which comprises a reinforced matrix of one of a thermosetting and a thermoplastic material into said injection mould so as to form a joint body portion around said metal parts and said central core, with a longitudinal geometric axis that lies in a plane with and forms an angle greater than 0° with each said central longitudinal axis of said bearing paths, said bearing paths thus being distributed around said longitudinal geometric axis, and so as to form complementary surfaces in said joint body portion complementary to and associated with said second surfaces of said metal parts.

8. The process of claim 7 and further comprising the step of:
coating surfaces of said metal parts other than said first surfaces with an antiadhesive agent before said step of placing said metal parts in position.

* * * * *